United States Patent [19]

Ragsdale

[11] Patent Number: 4,959,038

[45] Date of Patent: Sep. 25, 1990

[54] MILKWEED PROCESSING MACHINE

[75] Inventor: George Ragsdale, Ogallala, Nebr.

[73] Assignee: Natural Fibers Corp., Ogallala, Nebr.

[21] Appl. No.: 373,889

[22] Filed: Jun. 30, 1989

[51] Int. Cl.$^5$ .................... A01F 11/00; A01F 12/385; A01F 12/48

[52] U.S. Cl. ...................... 460/149; 460/75; 460/86; 460/88; 460/100

[58] Field of Search .......... 460/24, 59, 75, 76, 460/71, 83, 87, 88, 89, 100, 127, 131, 149, 86

[56] References Cited

U.S. PATENT DOCUMENTS

| | | | |
|---|---|---|---|
| 271,310 | 1/1883 | Buchanan | 460/100 X |
| 433,764 | 8/1890 | Colby | 460/75 |
| 699,044 | 4/1902 | Vraalstad | 460/88 X |
| 753,350 | 3/1904 | Beam | 460/83 |
| 833,700 | 10/1906 | Still | 460/100 X |
| 873,972 | 12/1907 | Wells | 460/100 X |
| 1,731,142 | 10/1929 | Lee | 460/75 |
| 1,831,208 | 11/1931 | Thoen | 460/100 X |
| 1,992,172 | 2/1935 | Anderson | 460/75 |

Primary Examiner—Hoang C. Dang
Attorney, Agent, or Firm—Zarley, McKee, Thomte, Voorhees & Sease

[57] ABSTRACT

A milkweed processing machine includes a housing having an inlet end and an outlet end. Milkweed pods are introduced into the inlet end and conveyed to a pod cracking chamber whrein a cylinder having rigid spikes projecting radially therefrom cracks the pods. The cracked milkweed pods are then conveyed to a picking chamber wherein a plurality of cylindrical members having fingers projecting therefrom will pick and loosen the floss and seeds from the cracked milkweed pods. The picking cylinders are arranged in parallel relationship and rotate in opposite directions. The picked and loosened floss and pods are then conveyed to a fluffing chamber which includes a rotating cylindrical member having a plurality of fingers which further fluff the loosened floss to remove the seeds from the floss. A fan directs a current of air through the loosened and picked floss materials to lift the floss and carry it to an outlet. The method of processing milkweed pods of the present invention includes the initial step of providing a processing machine which will perform the steps of the process. After introducing milkweed pods into the housing, the method for conveying the pods to a cracking chamber, cracking the pods to expose the floss, conveying the cracked pods to a picking chamber, picking the floss and seeds from the pods, and finally forcing air over the floss and seeds to lift the floss and carry the floss from the housing.

3 Claims, 3 Drawing Sheets

MILKWEED PROCESSING MACHINE

TECHNICAL FIELD

The present invention relates generally to machines for processing fibrous materials, and more particularly to a device for processing milkweed pods to separate the floss from the pod and seeds.

BACKGROUND OF THE INVENTION

It has been recently found that the floss derived from milkweed pods can be effectively utilized by the textile industry. Although the milkweed plant has similarities to cotton, the processing of the more delicate milkweed floss requires different methods and procedures than that utilized in the processing of cotton. Further, because the milkweed floss must be removed from a pod, the various machinery required is much different than that utilized in the processing of other textile fibers. Furthermore, the milkweed processing machine must be capable of separating the milkweed pod into three distinct elements, namely: floss, seeds, and chaff or "trash."

It is therefore a general object of the present invention to provide a new and novel milkweed processing machine.

Another object of the present invention is to provide a milkweed processing machine which will separate the floss from the milkweed pod.

A further object is to provide a milkweed processing machine which will separate the seeds from the milkweed pod.

Another object of the present invention is to provide a milkweed processing machine which will separate floss, seeds and chaff into three distinct components and convey them to three distinct areas for storage or disposal, within a single operation.

Yet another object of the present invention is to remove dust from above the material flow without the loss of lightweight fibers.

Still another object of the present invention is to provide a milkweed processing machine which will produce clean, usable milkweed floss without damaging the delicate fibers of the milkweed material.

Yet a further object is to provide a milkweed processing machine which is simple and economical in operation.

These and other objects of the present invention will be apparent to those skilled in the art.

SUMMARY OF THE INVENTION

The milkweed processing machine of the present invention includes a housing having an inlet end and an outlet end. Milkweed pods are introduced into the inlet end and conveyed to a pod cracking chamber wherein a cylinder having rigid spikes projecting radially therefrom cracks the pods against a base plate. The base plate has teeth projecting upwardly therefrom which intermesh with the spikes on the cylinder so as to assist in the cracking process. The base plate is curved to a radius corresponding with the cylinder to provide a greater cracking surface area parallel to the cylinder's surface.

The cracked milkweed pods are then conveyed to a picking chamber wherein a plurality of cylindrical members having fingers projecting therefrom will pick and loosen the floss and seeds from the cracked milkweed pods. The picking cylinders are arranged in parallel relationship and rotate in opposite directions so as to more effectively pick and loosen the floss from the pods. The picked and loosened floss and pods are then conveyed to a fluffing chamber which includes a rotating cylindrical member having a plurality of fingers which further fluff the loosened floss to remove the seeds from the floss.

A fan is utilized to direct a current of air through the loosened and picked floss materials to lift the floss and carry it to an outlet and thence to a storage area.

The remaining seeds, pod hulls and other fines are then dropped onto a vibrating screen, which will separate the seeds from the hulls and fines. The seeds will drop through the vibrating screen and are conveyed to a separate storage area. The hulls and fines are then removed from the housing for disposal.

The method of processing milkweed pods of the present invention includes the steps of providing a processing machine which will perform the steps of the process. After introducing milkweed pods into the housing, the method of the invention calls for conveying the pods to a cracking chamber, cracking the pods to expose the floss, conveying the cracked pods to a picking chamber, picking the floss and seeds from the pods, and finally forcing air over the floss and seeds to lift the floss and carry the floss from the housing. The method of the present invention also provides the further step of loosening the seeds from the floss in a fluffing step, prior to lifting the floss via air current and removal of the floss from the housing. A further step in the method of the invention calls for separating the seeds from the hulls and other fines, and conveying the seeds to a storage area.

DESCRIPTION OF THE PREFERRED EMBODIMENT

Figure 1:
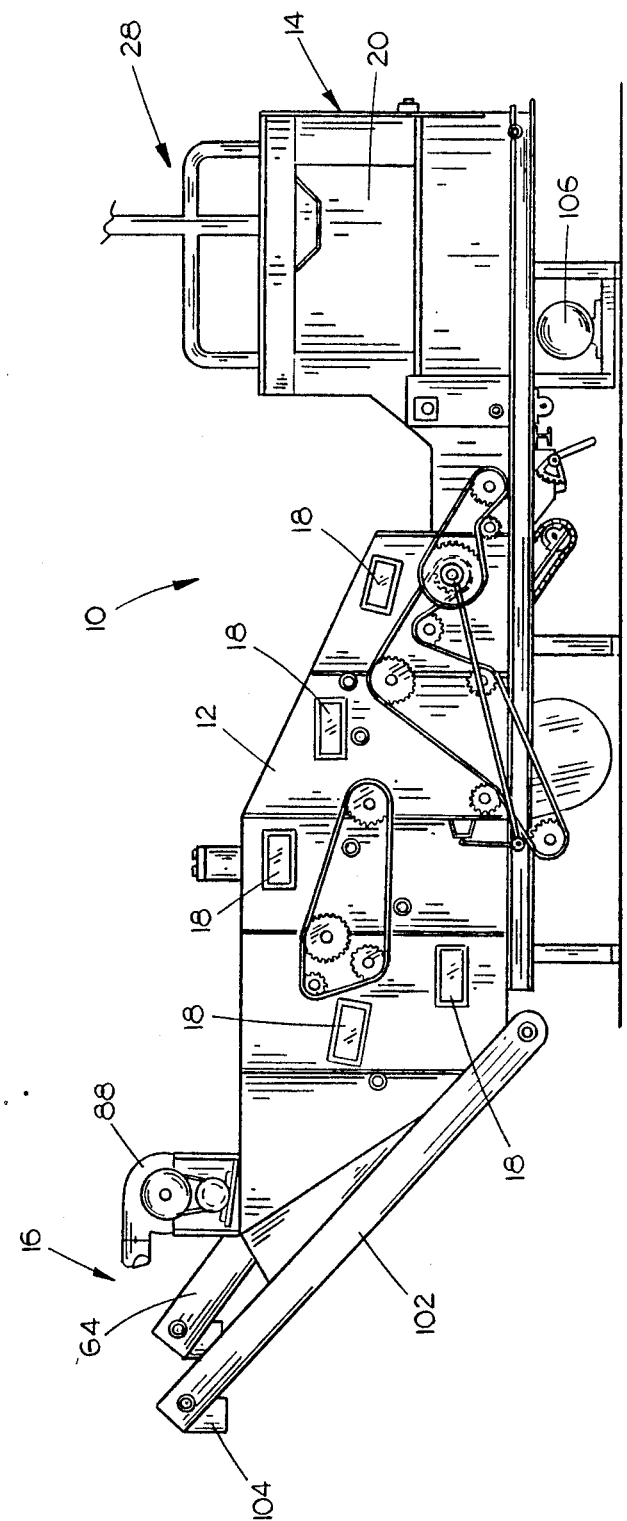
FIG. 1 is a front elevational view of the milkweed processing machine of the present invention.
Figure 2:
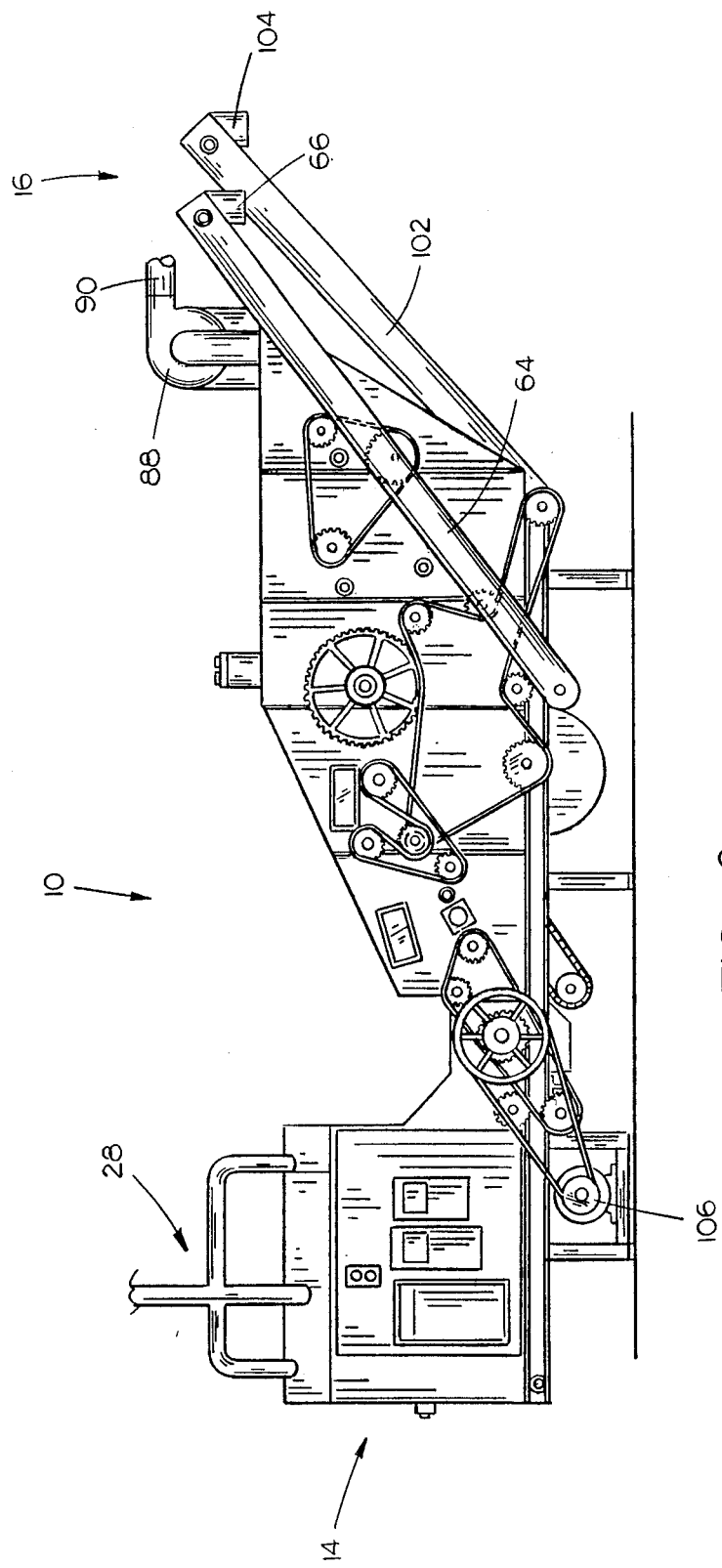
FIG. 2 is a rear elevational view of the invention.

Referring now to the drawings, in which identical or corresponding parts are identified with the same reference numeral, and more particularly to FIGS. 1 and 2, the milkweed processing machine of the present invention is designated generally at 10 and includes a housing 12 having a milkweed pod inlet chamber 14 at one end and three outlets 16 at the opposite end. A plurality of viewing windows 18 are arranged along the side of housing 12 such that the operator may view the material as it passes through the various stages of the processing operation.

Figure 3:
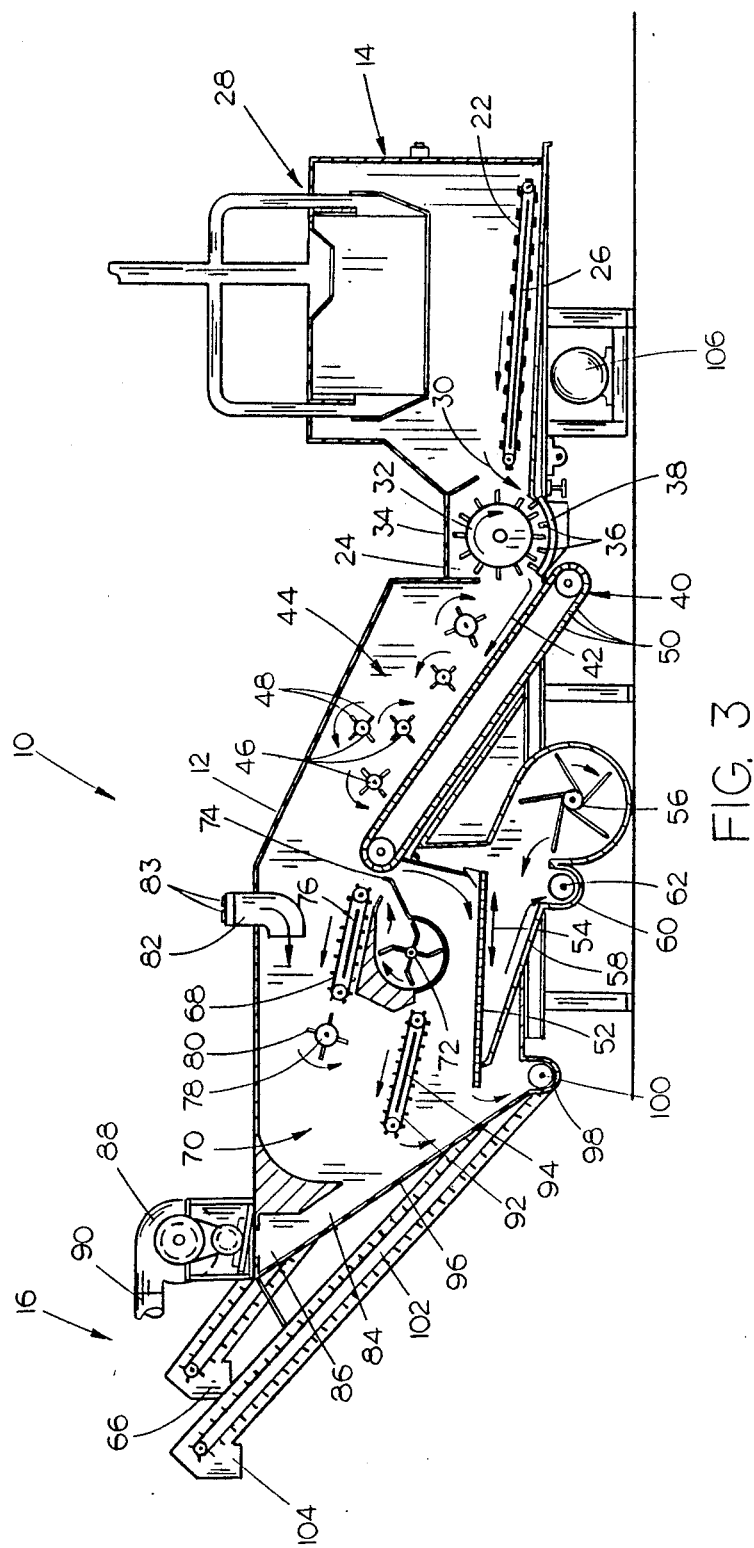
FIG. 3 is a cross-sectional view through the invention.

Inlet chamber 14 has a large forward opening 20 through which the milkweed pods are dumped into the processing machine 10. Referring to FIG. 3, a feed chain 22 is operably mounted in the bottom of inlet chamber 14 so as to carry the pods from inlet chamber 14 to the pod-cracking chamber 24. Feed chain 22 is of the continuous-loop type, and is mounted with a support plate 26 journaled within the feed chain loop to support the chain and the milkweed pods thereon. A plurality of air vents 28 are mounted within the top of inlet chamber 14 to remove dust and other airborne material which arises while dumping pods into the processing machine.

As the milkweed pods drop off the feed chain 22, as shown by arrow 30, they will fall into pod-cracking chamber 24. Pod-cracking chamber 24 has a cylinder 32 rotatably mounted therein transverse to the direction of travel of the pods coming from feed chain 22 Cylinder 32 has a plurality of rigid spikes 34 projecting radially therefrom which correspond with a series of rigid, stationary teeth 36 mounted on a base plate 38 which forms the floor of pod-cracking chamber 24. Spikes 34 will intermesh with teeth 36 on plate 38 so as to crack the milkweed pods forced therebetween by rotating cylinder 32. Base plate 38 is curved to a radius corresponding with cylinder 32, such that teeth 36 and spikes 34 intermesh at a constant distance along the entire length and width of plate 38.

Rotating cylinder 32 will then drop the cracked pods onto an inclined conveyor belt 40, as shown by arrow 42. Conveyor belt 40 carries the cracked pods into a picking chamber 44 which picks the floss from the pod husks, and loosens the lightweight floss fibers for the next step in the process. A series of rotating "picking" cylinders 46 having projecting fingers 48 thereon are oriented adjacent the inclined belt so as to loosen the floss from the other materials by picking the floss with fingers 48, and then tOssing the material among the adjacent rotating cylinders 46. It should be noted that cylinders 46 are each mounted so as to rotate in the opposite direction of the next adjacent cylinder, such that fingers 48 are continuously picking and pulling at the material being moved by the adjacent cylinder. This assists in further loosing and separating the floss from the pod husks and seeds.

Conveyor belt 40 is designed with a multitude of small, open pockets or cells 50 which will hold seeds and small pod and husk fragments, removing them from further picking. Materials within cells 50 will drop from conveyor belt 40 onto a shaker screen 52, as shown in the drawings. Screen 52 has a mesh of a size which will permit the passage of milkweed seeds, but prevent husks and other "trash" from passing therethrough. Screen 52 is oriented generally horizontally, and shakes or oscillates as shown by arrow 54. A fan 56 is located so as to blow air upwardly through screen 52 to assist in separating the seeds from the trash. The seeds passing through screen 52 fall onto an inclined plate 58 which directs the seeds to a trough 60. An auger 62 then conveys the seeds to an elevator 64 (see FIG. 2) which transports the seeds to seed outlet 66 for appropriate storage.

A slightly inclined conveyor 68 is located adjacent the upper end of conveyor belt 40, so as to carry floss and other material from picking chamber 44 to a fluffing chamber 70. A fan 72 is mounted so as to direct air flow upwardly between conveyor 68 and the upper end of conveyor belt 40. A baffle 74 is also located between conveyor 68 and conveyor belt 40 and will direct air flow from fan 72, as well as prevent larger materials from falling downwardly onto shaker screen 52. Air flow from fan 72 will assist in separating floss from the remaining materials loosened within picking chamber 44. Conveyor 68 is formed of a continuous-loop belt, and has a plate 76 mounted within the continuous loop in order to assist in directing the air flow towards fluffing chamber 70.

Fluffing chamber 70 has a fluffing cylinder 78 rotatably mounted therein adjacent the end of conveyor 68.

Fluffing cylinder 78 includes a series of fingers 80 which will toss and fluff the floss being carried from conveyor 68 and by air flow from fan 72. Because a large amount of air flow is necessary to separate the floss from remaining chaff or husks, an air inlet 82 is provided in housing 12 above conveyor 68. Injection caps 83 are mounted on air inlet 82, as shown in FIG. 3. Floss which is loosened and fluffed by cylinder 78 is then carried on air current from fans 72 and 56 to an outlet duct 84, and thence upwardly to an outlet chamber 86. A large fan 88 then blows the floss from chamber 86 through a conduit 90 to a storage area.

As noted above, fluffing cylinder 78 tosses floss in the air to be carried away by air current, thereby allowing chaff and other miscellaneous materials to drop onto a lower conveyor 92. Lower conveyor 92 also utilizes a continuous-loop type conveyor belt with a plate 94 mounted within the loop to assist in directing air flow. Lower conveyor 92 is located above shaker screen 52 so as to take advantage of air flowing from fan 56 to carry away any remaining lightweight floss from the miscellaneous materials dropped thereon.

All chaff, pod husks and other trash drops from lower conveyor 92 and shaker screen 52 downwardly onto the inclined end 9 6 of housing 12 and thence downwardly into a materials-collection trough 98. An auger 100 carries the trash to a conveyor 102 which transports the trash to outlet 104 for disposal as desired.

Thus, the milkweed processing machine 10 will separate milkweed pods into three distinct components in a single, efficient operation. As shown in FIGS. 1 and 2, all of the rotating cylinders, conveyors, and fans may be driven by a single motor 106, utilizing a series of belts, pulleys, and gears. Obviously, one or more of these components may be powered independently, or in specific groupings, as the user desires.

Whereas the invention has been shown and described with the preferred embodiment thereof, it will be understood that many modifications, substitutions and additions may be made which are within the intended broad scope of the appended claims. Thus there has been shown and described a milkweed processing machine which accomplishes at least all of the above-stated objects.

I claim

1. A method for removing floss from milkweed pods, comprising the steps of:
   providing a milkweed pod processing machine having a housing with an inlet and an outlet;
   introducing a plurality of milkweed pods into said housing inlet;
   conveying said pods to a cracking chamber;
   cracking open said pods to expose the floss therein;
   conveying said cracked pods to a picking chamber;
   picking milkweed floss from said pods; and
   forcing air over said picked pods to carry said floss to said housing outlet.

2. The method of claim 1, further comprising the step of fluffing said floss to further remove seeds and pod hulls.

3. The method of claim 2, further comprising the step of screening said seeds from the combination of pod hulls and seeds, and conveying the seeds from the housing.

* * * * *